United States Patent Office 3,179,099
Patented Apr. 20, 1965

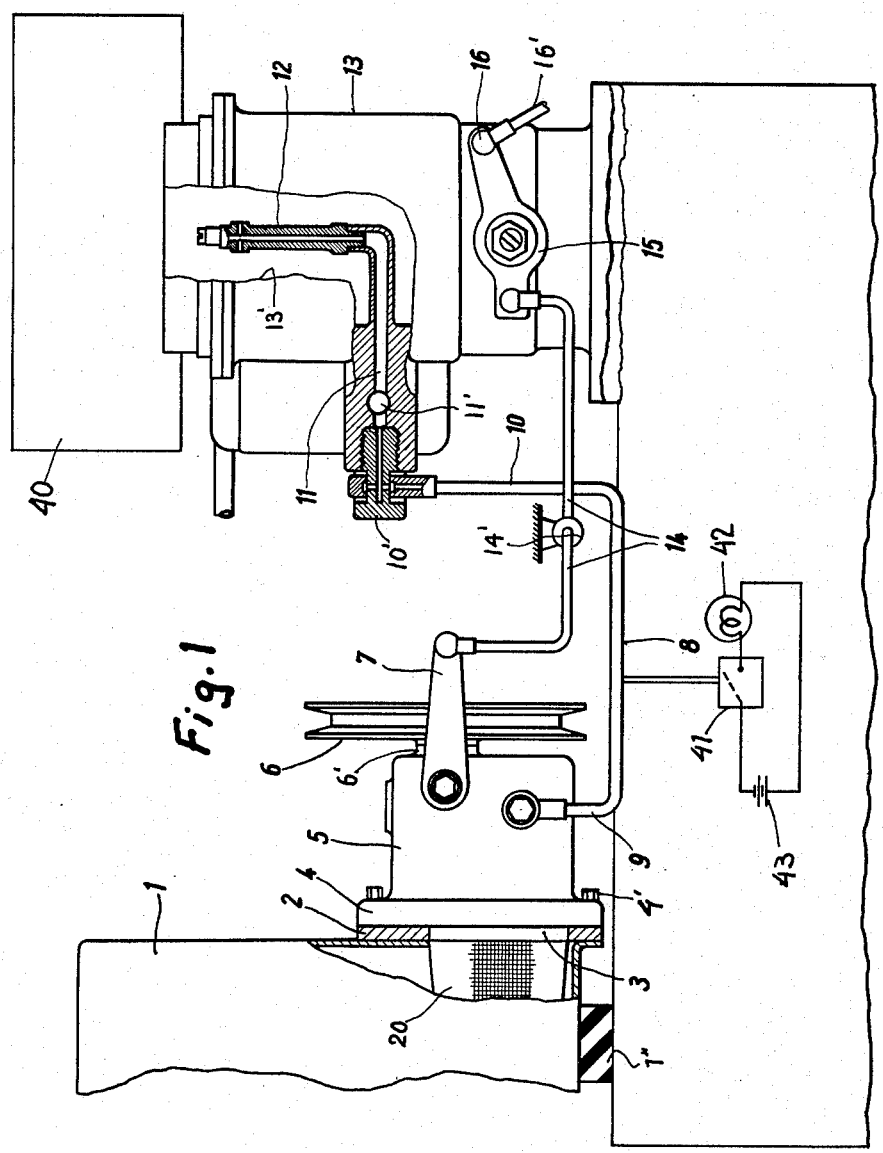

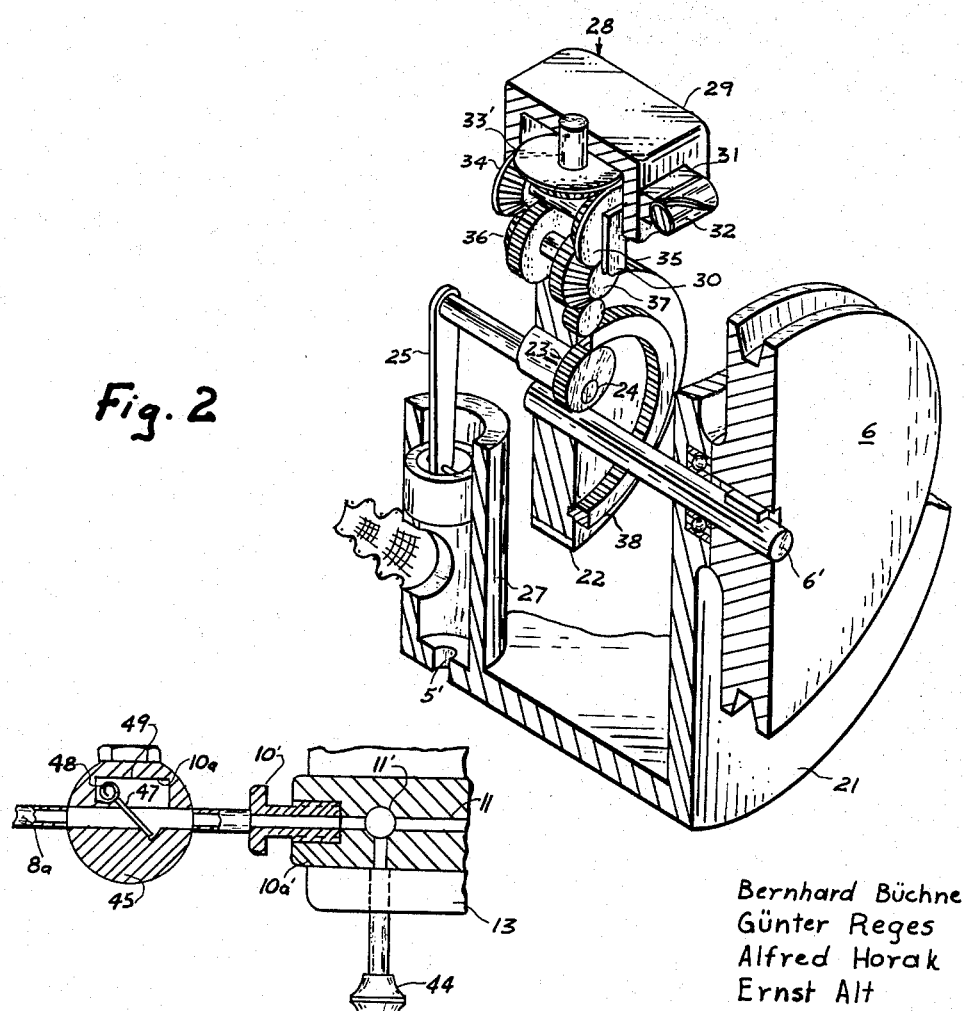

3,179,099
INTERNAL-COMBUSTION ENGINE WITH
GASOLINE/OIL-MIXTURE CONTROL
Ernst Alt and Bernhard Büchner, Ingolstadt, Günter
Reges, Lenting, and Alfred Horak, Bittenbrunn, Germany, assignors to Auto Union G.m.b.H., Ingolstadt,
Germany, a corporation of Germany
Filed Nov. 9, 1962, Ser. No. 236,537
Claims priority, application Germany, Nov. 10, 1961,
A 38,790
10 Claims. (Cl. 123—136)

Our present invention relates to an internal-combustion engine with gasoline/oil-mixture control and, more particularly, to an automatic control mechanism for the relative proportions of combustible fluid and lubricant introduced into the cylinder of an internal-combustion engine.

It is well known, particularly for internal-combustion engines having few cylinders, to provide automatic control of the relative proportions of the combustible fluid (e.g. gasoline) and a lubricant which together form a mixture fed via the carburator into the engine cylinders. The lubricant thus serves to reduce frictional interengagement of the piston and cylinder wall in the course of firing. Earlier devices have generally made use of throttle valves or the like controlled by the engine crank-shaft for adjusting the effective cross-section of a conduit between an oil reservoir and the carburetor. Such throttle valves were usually provided with a control slide or gate for selectively adjusting the throughput cross-section of the conduit means. For the most part the oil was aspirated into the carburetor, thereby producing a finely divided suspension of oil in the gasoline/air mixture. Control systems of this type had, however, a serious disadvantage in that the conduit means contained a considerable quantity of oil which continued to add to the gasoline at a previous rate regardless of an adjustment in the control system in response to a change in the rate of rotation of the crankshaft. Thus, a considerable lag between the instant of modified crankshaft operation and the response of the control system was evidenced in the proportion of oil added to the gasoline. Moreover, the mixing means involved in these earlier devices was exceedingly complex and required a complicated linkage between crankshaft, valve, flap or other throttling devices.

Furthermore, it has been found that throttle devices of this type generally fail to provide the correct proportion of oil when the throughput cross-section is at a minimum. It will be understood that such regulation becomes increasingly difficult as the total effective cross-section of the conduit means is reduced. Apertures of small cross-section are also prone to flow disruption as a consequence of the presence in the oil of any impurity.

Another disadvantage of known regulation systems derives from the fact that oil viscosity changes markedly with temperature, so that for a given flow cross-section the flow rate and proportion of oil added to the gasoline will also change with temperature. This disadvantage is particularly critical in oil-circulating systems wherein the lubricant fed to the carburetor is drawn from a recirculated flow thereof. In this case the temperature of the oil rises completely.

It is an object of the present invention to provide a lubricant/gasoline-mixture-control system adapted to obviate the aforementioned disadvantages and to provide positive and substantially instantaneous regulation of the proportion of oil in the mixture in response to changes in speed of the engine.

This object is attained, in accordance with the invention, in a control system comprising a pump having a continuously adjustable stroke for positively feeding the oil to a carburetor, and means for adjusting the stroke of this pump in accordance with the desired fuel/oil proportions. Advantageously, the oil is admixed with the fuel only just prior to the atomization or gasification thereof and is forced by the pump through an unbranched circuit. Since continuous circulation of the oil is avoided in this construction, its rate of feed to the gasification chamber is substantially independent of its viscosity. Advantageously the pump inlet is of relatively large cross-section and minimum length in comparison with the outlet so that no suction throttling of the oil results. The pump is preferably of the positive-displacement type whereby the stroke thereof determines the quantity of oil fed to the gasification chamber. Since admixture of the oil with the fuel occurs just prior to the passage of the mixture through the gasifying nozzle, no control lack or inertia results. It will thus be apparent that, for each variation in the position of the carburetor flaps or throttle, an immediate adjustment of the rate of flow of the oil results.

Another advantage of the present system is that, in the course of prolonged descents in hilly terrain or travel with a relatively small load the oil feed is adjusted accordingly as a consequence of the coupling of the pump with the crankshaft so that the oil is fed in proportion to the number of revolutions per minute characterizing the rate of operation of the engine. Thus, in all cases, sufficient lubricant is provided at all speeds and for all loads.

According to another feature of the invention the control means for the stroke of the pump is directly coupled with the throttle (butterfly-valve) actuator of the carburetor to effect direct regulation of the oil fed upon changes in the throttle setting.

I has also been found to be desirable to form the aforementioned conduit means with a generally horizontally extending portion wherein the lubricant is admixed with the fuel and which communicates with the gasification nozzle. Advantageously the conduit means comprises a substantially vertical portion feeding this horizontal portion so that, in a stationary condition of the vehicle and engine, any gasoline within the conduit means remains above the oil therein, thereby insuring a clear separation between oil and gasoline. It will thus be apparent that there is no possibility in the instant system for excessive oil to be fed to the carburetor upon starting.

It should be understood that failure to maintain a separation between the oil and gasoline in the carburetor feed line will result in the initial feeding of a mixture containing an excess of oil and remaining from previous operation of the vehicle to the carburetor during starting. This initial oil-rich mixture will be followed by a mixture containing only a minimum amount of oil so that insufficient lubricant is present. It is also possible to employ a unidirectionally effective valve as separating means at the junction between the oil and gasoline conduits to maintain a separation of the two liquids in the stationary machine. Such a check valve can be provided with a spring-loaded plate which is easily opened by the oil displaced by the pump so that it presents only a minimum resistance to oil flow.

The above and other objects features and advantages of the present invention will become more readily apparent from the following description, reference being made to the accompanying drawing in which:

FIG. 1 is a schematic elevational view of a mixture-control system according to the invention;

FIG. 2 is a fragmentary perspective view of the oil pump thereof; and

FIG. 3 is a view of a portion of a modified system.

In the system shown in the drawing an oil reservoir 1 is mounted on a motor block 1' by shock-absorber feet 1" (e.g. rubber cushions) in the usual manner. The reservoir 1 is provided with an annular flange 2 at its outlet opening into which is fitted an oil filter 20 of a pump 5 bolted to this flange. This oil pump is formed with an inlet 3, substantially coextensive with the reservoir outlet and having an aperture considerably greater than that of the outlet 5' of this pump so that there is little pressure loss between the reservoir and the pump cylinder. The pump 5 also has an annular flange 4 through which the bolts 4' pass to engage flange 2. A V-belt pulley 6 rotates the shaft 6' of this pump and is driven by the conventional V-belt of the crankshaft (not shown) of the engine. This V-belt may, of course, be identical with that employed for driving a generator and/or fan of the engine when the latter is provided with such devices.

The oil line 8–10 leading from pump 5 is provided with a descending portion 9 and an ascending portion 10, both of which are generally vertical, interconnected by a relatively short horizontal portion 8. The vertical, terminal portion 10 of this line feeds, via a coupling head 10', the inlet tube 11 of the carburetor 13. The latter is formed generally centrally of its vaporization or atomizing chamber 13' with an atomizing nozzle 12 communicating with inlet tube 11. The tube is provided with a branch or duct 11' in the usual manner for supplying gasoline to the nozzle 12. The fuel-supply conduit 11' may thus be coupled with the usual fuel pump 44 (FIG. 3). The carburetor 13 is also mounted upon the cylinder block 1' in the conventional manner for supplying the fuel/air mixture to the engine cylinders. A link lever 14 fulcrumed at 14' to the engine housing couples the throttle-actuating lever 15 of carburetor 13 with a control arm 7 for adjusting the stroke of pump 5. A ball joint 16 also connects this lever 15 with the fuel-feed or gasoline pedal (not shown) via a rod 16'.

The pump 5 may be of any common variable-stroke type and, as indicated in FIG. 2, may comprise a housing 21 in which the shaft 6' of V-belt pulley 6 is journaled. This shaft may carry a gear 22 into which is inset a disk 23 rotatable about its axis. This disk is also provided with gear teeth. Disk 23 carries an eccentric pin 24 on which is articulated a connecting rod 25 pivotally joined to a piston 26. The latter is reciprocable within a cylinder 27 to draw fuel into the pump by an inlet 13 and force it out of the latter via outlet 5'. It will be noted that inlet 3' is much larger than the inlets of conventional pumps so that the flow of viscous fluid therethrough is substantially independent of temperature. The pumping rate will depend upon the angular velocity of shaft 6' as determined by the speed of the engine crankshaft and the stroke of the piston 26. This stroke is continuously adjustable by means for effecting variations of the throw of the eccentric formed by gear 22 and disk 23. Such means may include a differential 28 whose housing 29 is mounted upon an arm 30 journaled for rotation of shaft 6'. The housing 29 is provided with gear teeth 31, meshing with a worm 32 rotatable by adjusting arm 7 in accordance with the position of the vehicle throttle and is formed with a bevel gear 33 in mesh with a pair of further bevel gears 34. 35 respectively engaging a transmission gear 36 and an idler 37. The latter meshes externally with a ring gear 38 whose inner teeth entrain the teeth of disk 23 while transmission gear 36 meshes directly with gear 22. It will thus be apparent that angular displacement of arm 7 to rotate worm 32 will shift the housing 29 of differential 28 clockwise or counterclockwise about shaft 6', depending upon the direction of displacement of the arm 7. This motion of the differential housing will effect a relative rotation between gears 22 and 38 which normally rotate concurrently as a consequence of their frictional interengagement. Disc 23 will thus be rotated about its axis to alter the distance between eccentric 24 and the axis of rotation thereof through shaft 6'. This arrangement thus varies the stroke of the piston 26 in accordance with the position of the throttle actuator 15. Other variable-stroke pumps of the gear, piston or diaphragm type may also be employed. Such devices may incorporate mechanisms (e.g. servo-systems) for adjusting the effective length of a piston rod or the throw of an eccentric.

When the engine, which is preferably of the two-cycle or stroke type, is started in the usual manner, say, in cold weather, the rotation of the crankshaft under no-load conditions results, especially for motors with a small number of cylinders, in vibrations of the cylinder block to a greater or lesser extent. These vibrations are transmitted to the reservoir 1 and to the lubricating oil contained therein. The oil flow through the opening 3 of large cross-section and minimum length into the pumping cylinder 27 of pump 5 whence it is forced into conduit 8 via outlet 5'. The oil flows through the vertical portion 10 of this conduit which prevents mixture of oil and gasoline therein since the oil is heavier than gasoline and forms a layer below a well-defined interface separating supernatant gasoline and oil. The liquid fed to the nozzle 12 of carburetor 13 is thus rich in gasoline until the crankshaft begins to rotate with sufficient velocity and consistency to pump oil into the mixing inlet 11 of the carburetor. The mixture is displaced at a relatively high rate so that the oil is mixed well with the gasoline and deposited in a fine spray upon the moving parts with the air drawn into carburetor 13 via the air filter 40. The fuel/air mixture then passes into the cylinders via the throttle flap controlled by actuator 15.

Travel of the vehicle in a load-free or low-load state results in a reduced opening of the throttle valve and a correspondingly small displacement of its actuator 15 so that arm 7, coupled therewith, maintains the stroke of the pump relatively small. The flow of oil to the engine is thus limited to that necessary to maintain proper lubrication. Upon acceleration, however, depression of the gas pedal effects an increased rotation of the crankshaft and of pump shaft 6' to increase the rate of flow of oil to the moving parts. A similar increase in the flow rate is effected whenever the gas pedal is depressed while the engine rotates with constant speed. This is the case when the vehicle is loaded and greater engine power is required for continued operation of the vehicle. The increased flow derives from an increase in piston stroke as a consequence of the displacement of arm 7 in response to actuation of lever 15.

Conduit 8 is provided with a pressure-sensitive switch 41 which responds to the oil pressure within this conduit to close a warning circuit including an indicator lamp 42 and a battery 43 to reveal a lack of oil to the vehicle operator. This lack of oil may derive from pump failure, leakage, or exhaustion of the fluid within reservoir 1.

When space conditions do not permit use of a vertical conduit portion 10 to maintain a separation between oil and gasoline, we prefer to provide a check valve of the general type shown in FIG. 3. The check valve 10a is interposed in oil conduit 8a intermediate the pump and a connector 10a' joining this conduit with mixing line 11' of carburetor 11. The gasoline line 11' thereof receives fuel from the fuel pump 44 in the usual manner. Check valve 10a comprises a body 45 forming a seat 46 for a valve plate 47 which is pivoted at 48 for rotation against the force of a coil spring 49. Plate 47 is seated lightly against the seat 46 and maintains a separation between gasoline in line 11 and oil in conduit 8a when pump 5 is inoperative. Counterflow of gasoline into the conduit is, however, prevented. Since flap 47 lifts readily upon operation of pump 5, the proper fuel/oil mixture is fed to the carburetor immediately after starting.

The invention as described and illustrated is believed to admit of many modifications and variations within the ability of persons skilled in the art, all such modifications and variations being deemed to be included within the spirit and scope of the appended claims.

We claim:

1. In a system for the addition of a lubricant liquid to a fuel in an internal-combustion engine having a carburetor and a crankshaft, in combination, a reservoir for said lubricating liquid, a pump mounted on said engine and driven by said crankshaft for displacing liquid drawn from said reservoir, said carburetor having an atomizing chamber and a fuel-injection nozzle opening into said chamber, inlet means for supplying said fuel to said nozzle and including a tube at said carburetor communicating with said nozzle and a duct feeding said fuel to said tube, and conduit means connecting said pump with said tube at said carburetor rearwardly of said duct for admixing said liquid with said fuel adjacent said nozzle.

2. In a system for the addition of oil to gasoline in an internal-combustion engine having a carburetor and a crankshaft, in combination, a reservoir for said oil; an adjustable-stroke oil-displacement pump mounted on said engine and driven by said crankshaft for displacing oil drawn from said reservoir, said carburetor having an atomizing chamber a fuel-injection nozzle opening into said chamber and throttle-control means for regulating relative proportions of gasoline and air fed to said engine; inlet means for supplying said gasoline to said nozzle and including a tube at said carburetor communicating with said nozzle and a duct feeding said fuel to said tube; conduit means connecting said pump with said tube at said carburetor rearwardly of said duct for admixing said oil with said gasoline adjacent said nozzle; and link means interconnecting said pump and said throttle-control means for adjusting the stroke of said pump to increase the proportion of oil admixed with gasoline upon an increase in the rate at which gasoline is fed to said engine.

3. In a system for the addition of a lubricant liquid to a fuel in an internal-combustion engine having a carburetor and a crankshaft, in combination, a reservoir for said lubricating liquid, a pump mounted on said engine and driven by said crankshaft for displacing liquid drawn from said reservoir, said carburetor having a fuel-injection nozzle, inlet means for supplying said fuel to said nozzle, and conduit means connecting said pump with said inlet means for admixing said liquid with said fuel therein adjacent said nozzle; and separating means intermediate said inlet means and said conduit means for preventing the mixture of fuel and lubricating liquid therein upon inactivation of said pump.

4. In a system for the addition of oil to gasoline in an internal-combustion engine having a carburetor and a crankshaft, in combination, a reservoir for said oil; an adjustable stroke oil-displacement pump mounted on said engine and driven by said crankshaft for displacing oil drawn from said reservoir, said carburetor having a fuel-injection nozzle and throttle-control means for regulating relative proportions of gasoline and air fed to said engine; inlet means for supplying said gasoline to said nozzle; conduit means connecting said pump with said inlet means for admixing said oil with said gasoline therein adjacent said nozzle; link means interconnecting said pump and said throttle-control means for adjusting the stroke of said pump to increase the proportion of oil admixed with gasoline upon an increase in the rate at which gasoline is fed to said engine; and separating means intermediate said inlet means and said conduit means for preventing the mixture of gasoline and oil therein upon inactivation of said pump.

5. The combination as defined in claim 4 wherein said conduit means is formed with a vertically and upwardly extending tube portion adjacent said inlet means and terminating therein at an upper part thereof for limiting admixture of said gasoline and oil upon inactivation of said pump.

6. The combination as defined in claim 4 wherein said conduit means is formed with unidirectionally effective valve means at said inlet means for blocking flow of gasoline into said conduit means while permitting passage of oil into said inlet means.

7. The combination as defined in claim 6 wherein said valve means comprises a valve seat, a plate shiftable into and out of engagement with said seat, and spring means lightly biasing said plate in the direction of said seat.

8. The combination as defined in claim 4 wherein said conduit means is provided with pressure-responsive sensing means, and indicator means coupled with said sensing means for warning the operator of said vehicle of the absence of oil in said conduit means.

9. The combination as defined in claim 4 wherein said carburetor is provided with a butterfly-flap throttle, said throttle-control means comprising an actuating level coupled with said throttle, said link means including another lever articulated to said actuating lever.

10. The combination as defined in claim 4, further comprising drive means directly coupling said pump with said crankshaft for rotation thereby to displace said oil through said conduit means at a rate varying with the angular velocity of said crankshaft.

References Cited by the Examiner

UNITED STATES PATENTS 2,935,057  5/60  Perlewitz _____ 123—127

FOREIGN PATENTS 75,171  1/19  Austria.
949,855  9/56  Germany.

KARL J. ALBRECHT, *Acting Primary Examiner.*

RICHARD WILKINSON, *Examiner.*